United States Patent
Gupta et al.

(10) Patent No.: US 9,305,058 B2
(45) Date of Patent: Apr. 5, 2016

(54) DETERMINING AN EXECUTION ORDERING

(75) Inventors: Chetan Kumar Gupta, San Mateo, CA (US); Song Wang, Mountain View, CA (US); Abhay Mehta, Austin, TX (US); Mo Liu, San Jose, CA (US); Elke A. Rundensteiner, Acton, MA (US)

(73) Assignee: Hewlett Packard Enterprise Development LP, Houston, TX (US)

( * ) Notice: Subject to any disclaimer, the term of this patent is extended or adjusted under 35 U.S.C. 154(b) by 776 days.

(21) Appl. No.: 13/285,785

(22) Filed: Oct. 31, 2011

(65) Prior Publication Data

US 2013/0110820 A1    May 2, 2013

(51) Int. Cl.
*G06F 17/00* (2006.01)
*G06F 17/30* (2006.01)

(52) U.S. Cl.
CPC .............................. *G06F 17/30516* (2013.01)

(58) Field of Classification Search
CPC .................... G06F 17/30091; G06F 17/30126; G06F 17/30067; G06F 17/30115
USPC .................................................. 707/716, 797
See application file for complete search history.

(56) References Cited

U.S. PATENT DOCUMENTS

| | | | |
|---|---|---|---|
| 6,105,018 A * | 8/2000 | Demers et al. | |
| 6,571,249 B1 | 5/2003 | Garrecht et al. | |
| 7,415,391 B2 | 8/2008 | Chen et al. | |
| 2007/0260582 A1 | 11/2007 | Liang | |
| 2009/0083253 A1 | 3/2009 | Bellamkonda | |
| 2010/0306709 A1 | 12/2010 | Lynch et al. | |

* cited by examiner

*Primary Examiner* — Truong Vo
(74) *Attorney, Agent, or Firm* — International IP Law Group, PLLC

(57) ABSTRACT

There is provided a computer-implemented method of determining an execution ordering. An exemplary method comprises generating a directed graph based on a hierarchy. The hierarchy includes a plurality of pattern queries. The method also includes determining a minimum spanning tree of the directed graph. The method further includes determining an execution order of the pattern queries based on the minimum spanning tree.

20 Claims, 6 Drawing Sheets

DETERMINING AN EXECUTION ORDERING

BACKGROUND

The use of complex event processing (CEP) systems is on the increase in various industries that generate real-time streaming data. One challenge in processing such data is the ability to efficiently execute multiple queries on streaming data in real-time.

BRIEF DESCRIPTION OF THE DRAWINGS

Certain exemplary embodiments are described in the following detailed description and in reference to the drawings, in which.

DETAILED DESCRIPTION

Figure 1:
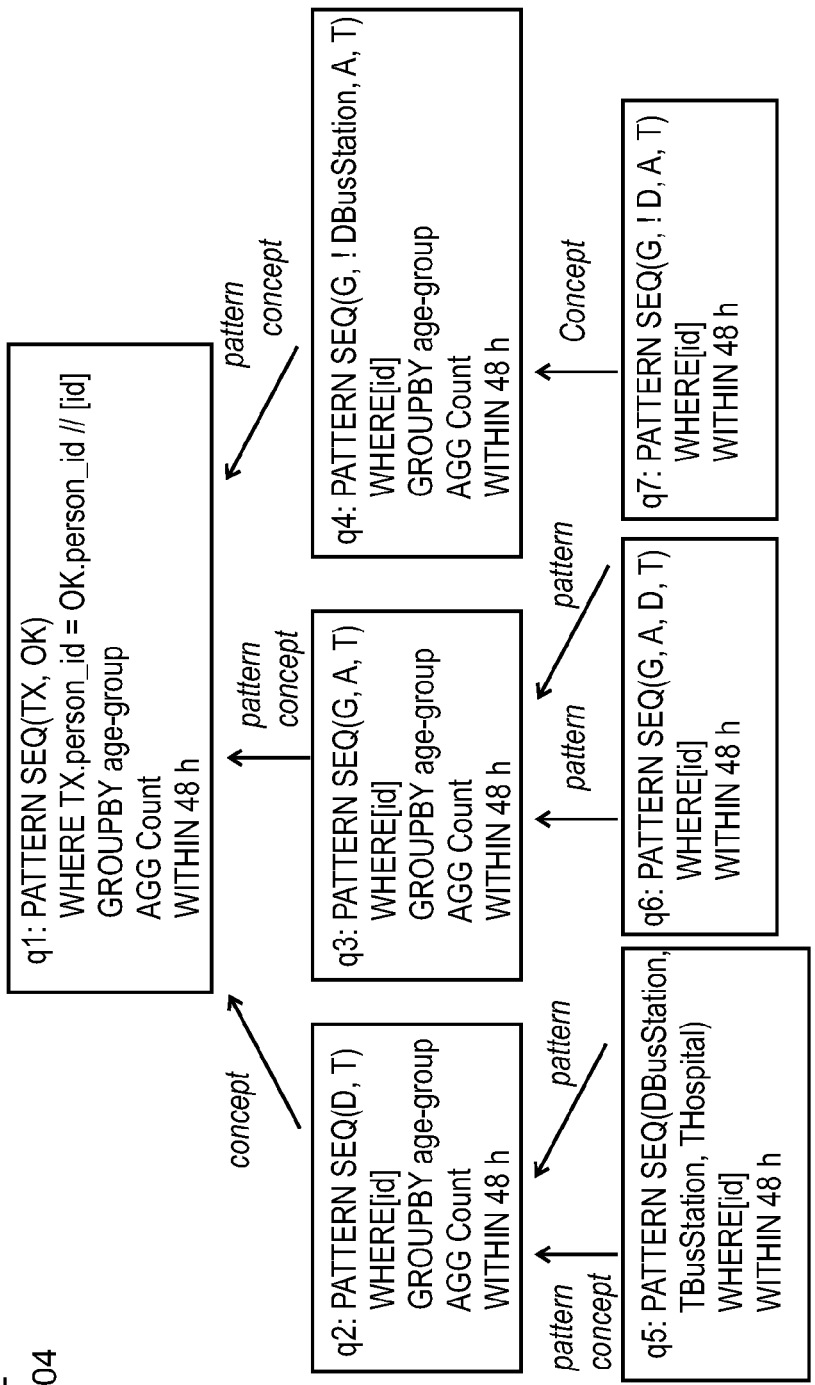
FIG. 1 is a diagram of a pattern query hierarchy, in accordance with embodiments.

Complex event processing (CEP) is a system that processes a large number of events happening across all the layers of an organization. The CEP system typically identifies meaningful events within an event cloud, analyzes their impact, and takes subsequent action in real time. One example of a CEP system is a CEP system used in disaster relief. For example, a CEP system may be used to analyze data gathered in relation to relief efforts following a hurricane. The CEP system may be communicatively coupled to a tracking system that provides streaming data about the mass movement of people and goods. In such a system, terabytes of streaming data may be generated for emergency personnel users to query at various levels of abstraction. For example, traveling from Texas to Oklahoma may be described at two levels of abstraction, a statewide event, and a local event. The statewide events may be leaving Texas, and arriving in Oklahoma. The local events may be leaving from a Dallas bus station, and arriving at a Tulsa hospital.

The CEP system may query streaming data received from the tracking system. For example, federal authorities may be interested in the routing of resources to evacuees. As such, the federal authorities may query streaming data to track the movement of people from Texas to neighboring states, such as Oklahoma. However, local authorities may focus on the movement of people, originating at a particular bus station in Dallas and ending in a Tulsa, Okla. hospital. This information may be used to determine whether local resources are to be provided at the Dallas bus station or the Tulsa hospital. These various users may run pattern queries to derive this information. A pattern query is similar to a database query. However, the pattern query operates on streaming data. Further, the pattern query is typically configured to select data on event patterns. An event pattern is the occurrence of multiple, specified events.

Although the events may be described at various levels of abstraction, each event may be represented by a single event record, e.g., leaving the Dallas bus station, and arriving at the Tulsa hospital. Accordingly, separate pattern queries for statewide or local events may process the same data. As such, running separate queries within a single query execution may be more efficient than running each query in a separate execution. In this way, the pattern queries may share results in a unified query plan. The query plan specifies how the pattern queries are implemented, and in what order they are executed. The order within which the pattern queries are executed may affect the efficiency of the queries.

In embodiments, an efficient ordering may be determined for the execution of multiple pattern queries in a unified query plan. In such an embodiment, one pattern may be determined from another, previously computed pattern. A hierarchy of the pattern queries may be useful in such an embodiment. The hierarchy may describe relationships between the pattern queries, which may be used to determine the ordering for all queries in the hierarchy such that the total execution cost is reduced. Furthermore, although embodiments are described in relation to a CEP system used in disaster relief, it will be appreciated that the techniques disclosed herein can be applied to any suitable type of CEP system.

FIG. 1 is a block diagram of a query hierarchy 100, in accordance with embodiments. The query hierarchy 100 includes example pattern queries 102, labeled $q_1$-$q_7$. Each pattern query 102 shown includes shorthand representing specific data. For example, as represented in the hierarchy, the pattern queries 102 include a shorthand where the letter, D, represents "Dallas," the letter, T, represents "Tulsa," the letter, G, represents, "Galveston," and the letter, A, represents "Austin" Similarly, the character, "!" represents the function of inequality. For example, in $q_7$, the term, "!D" references people not moving from Dallas.

The pattern queries 102 are arranged in parent-child relationships 104 based on their levels of abstraction. The arrows point from the child to the parent in each of the relationships 104. From the top to the bottom of the hierarchy 100, the pattern queries 102 may be refined from a general level of abstraction to a more specific level. For example, the pattern query 102 at the top of the hierarchy 100, $q_1$, references people moving between Texas and Oklahoma. However, a pattern query 102 at the bottom of the hierarchy 100, $q_5$, references people moving from Dallas to Tulsa. This refinement between general and specific data may be classified as changes in a pattern or a concept. For general to specific, a change in pattern indicates adding a new event type in the pattern and a change in concept indicates going from a higher abstraction level to a lower abstraction level for an event type.

Accordingly, the relationships 104 between each of the pattern queries 102 may be described in one of the following categories: (1) general-to-specific with either a pattern or a concept change, e.g., the relationship from $q_1$ to $q_2$; (2) general-to-specific with both pattern and concept changes, e.g., the relationship from $q_1$ to $q_3$; (3) specific-to-general with either a pattern or concept change, e.g., the relationship from $q_6$ to $q_3$; and (4) specific-to-general with both pattern and concept changes, e.g., the relationship from $q_5$ to $q_2$. As described below in relation to FIG. 2, the hierarchy 100 may be used to identify potential ways to determine an execution ordering of the pattern queries 102 in a unified query plan.

Figure 2:
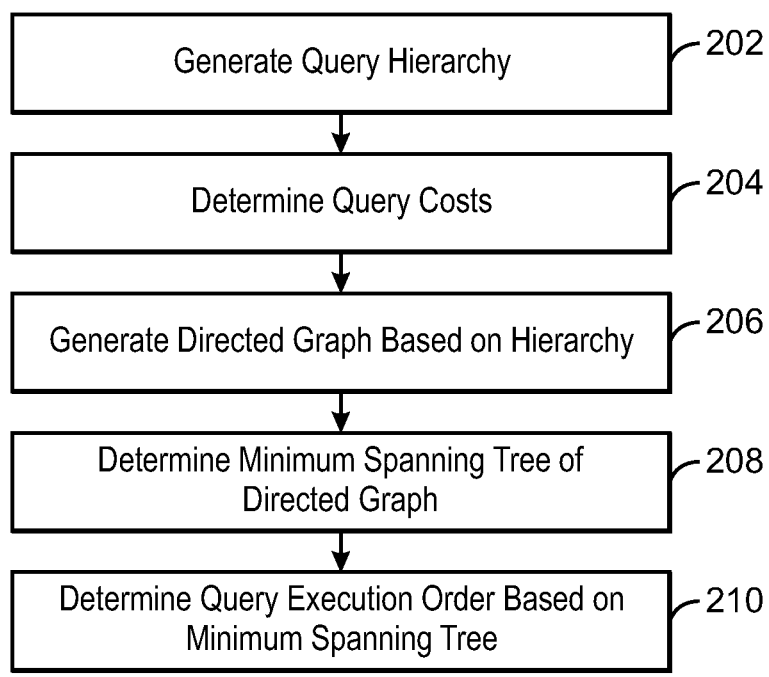
FIG. 2 is a process flow diagram showing a computer-implemented method for determining an execution ordering, in accordance with embodiments.
Figure 3A:
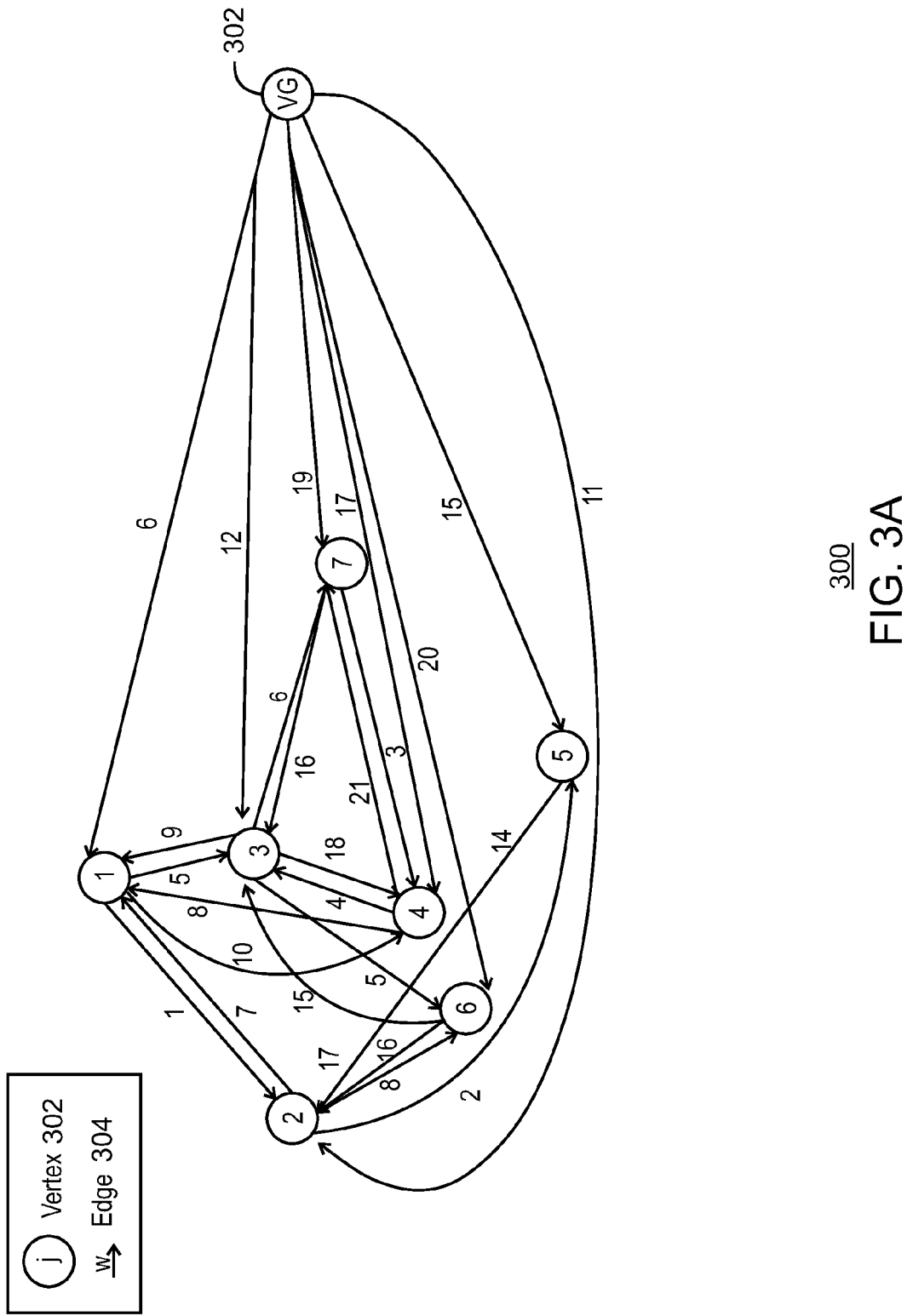
FIGS. 3A and 3B are diagrams of a directed graph, in accordance with embodiments.
Figure 3B:
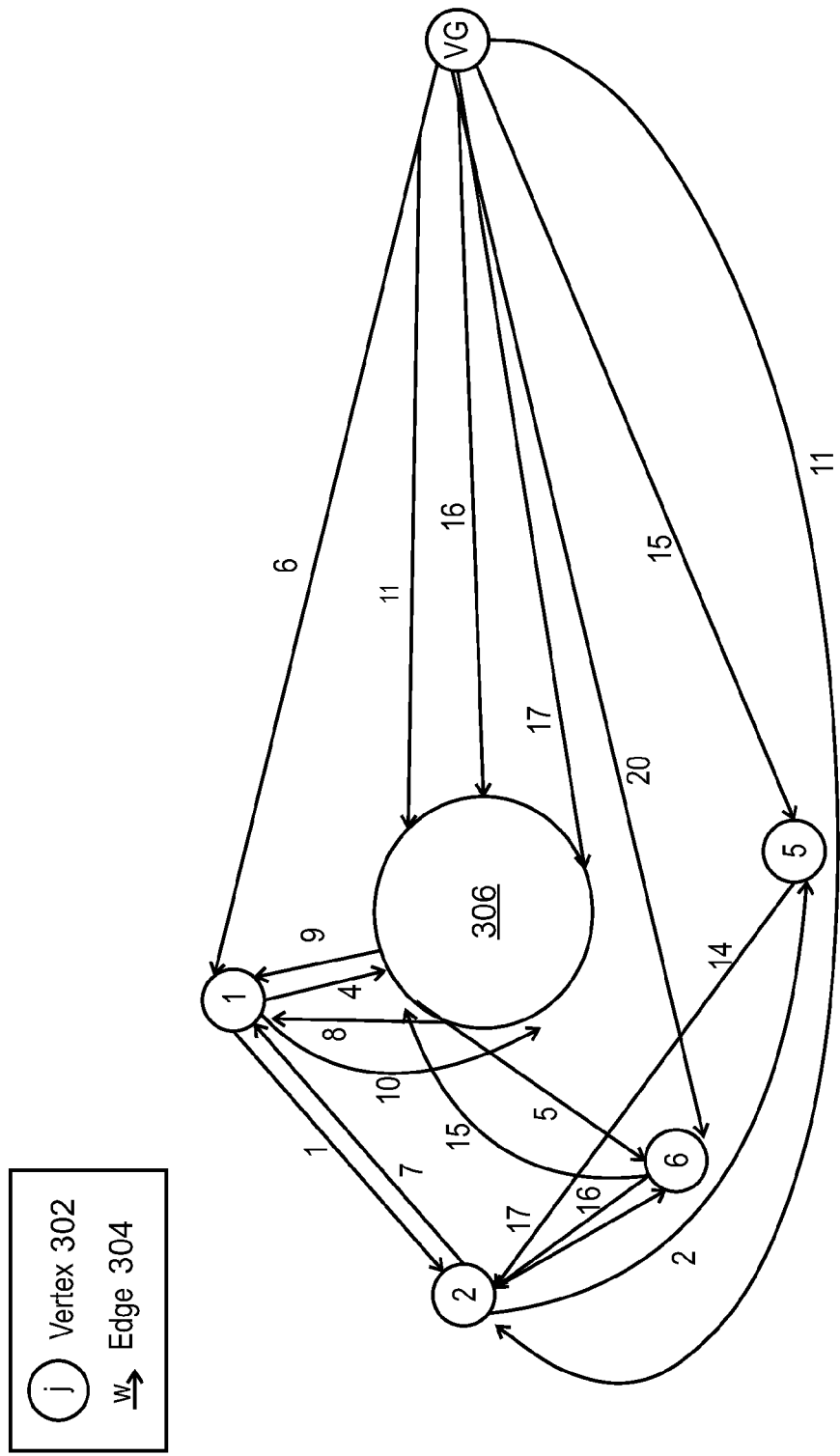

FIG. 2 is a process flow diagram showing a computer-implemented method 200 for determining an execution ordering, in accordance with embodiments. It should be understood that the process flow diagram is not intended to indicate a particular order of execution. The method 200 may be performed by a query optimizer, which generates query plans for execution by an execution engine. The method 200 is described with reference to FIGS. 1, 3A, and 3B. FIGS. 3A and 3B are diagrams of a directed graph 300, in accordance with an embodiment of the present techniques.

The method may begin at block 202, where the query hierarchy 100 may be generated. In embodiments, the query hierarchy 100 may be generated manually. At block 204, the cost for executing the queries 102 may be determined. The cost for executing a query, $q_j$, may be determined based on an order of execution of the query. For example, the query, $q_j$, may be executed independently, such as by a stack-based join. Additionally, the query, $q_j$, may be conditionally computed from an ancestor, $q_i$ or conditionally computed from a descendant, $q_i$. The cost of these scenarios are represented herein with the respective notations $C_{compute(qj)}$, $C_{compute(qj/qi)}$, and $C_{compute(qi/qj)}$. The cost of executing $q_j$, may be represented as $C_{qj}$, which may be equal to one of $C_{compute(qj)}$, $C_{compute(qj/qi)}$, and $C_{compute(qi/qj)}$.

At block 206, a directed graph 300, G(V,E), may be generated based on the hierarchy 100, H. The directed graph 300 may include vertices 302, and edges 304, which are also referred to herein as G(V,E), V, and E, respectively. For example, a directed graph, may be represented as G=(V, E), where $|V|=|queries \in H|+1$; $|E|=2\times|edges \in H|+|queries \in H|$. A mapping from H to G, m: H→G, may specify that for all $qi \in H$, there is a one-to-one mapping to one vertex $v_i$ in G. The vertices, V, may include a root vertex, $v_0$, referred to herein as the virtual ground. The virtual ground is described in greater detail below.

Additionally, m: H→G may specify that for all <qi, qj> refinement relationships in H, there exist two edges e(vi, vj) and e(vj vi)∈E. For all vi∈G where vi≠v0, G includes a directed edge e(v0, vi). The directed edge e(v0, vi) represents the execution scenario where $q_j$ is computed independently, i.e., from "the virtual ground." The mapping, m: H→G, may further specify computation costs that are assigned as weights on each edge 304. Each directed edge e(v0, vi)∈E is assigned an associated weight w(v0, vi) equal to $C_{compute(qi)}$. Each directed edge e(vi, vj)∈E with vi≠v0 and vj≠v0 may be assigned a weight w(vi, vj) to denote $C_{compute(qj/qi)}$ or $C_{compute(qi/qj)}$.

The pattern and concept refinement relationships in H, along with their respective computation costs, are captured as edges 304 and weights in the graph 300. In this way, the various possibilities of self-computation for the queries 102 in H are represented. Thus, the various possible sequences for computing the queries 102 in H are represented in the directed graph 300.

The directed graph 300 represents the mapping, m: H→G. Each vertex 302 with a number, j, denotes the query qj. As shown, there are eight vertices 302 in the graph G representing q1-q7 and the virtual ground. The edge 304 labeled with 12 from the virtual ground to q3 represents the cost to compute q3 independently. The cost may be expressed in processing units. The edge 304 labeled with 5 from q1 to q3 represents the cost to compute q3 from its ancestor, q1. The edge 304 labeled with 9 from q3 to q1 represents the cost to compute q1 from its descendant, q3.

Referring back to FIG. 2, at block 206, a minimum spanning tree of the graph, G, may be determined to determine the execution ordering of queries that has the lowest computational cost. After mapping the hierarchy, H, to a weighted directed graph, G, an efficient execution ordering $O_i(H)$ may be equal to a minimum cost spanning tree (MST) over G. The MST problem is to find a rooted directed spanning tree (MST) of G such that the sum of costs associated with all edges 304 in the MST is the minimum cost among all possible spanning trees.

An MST is a graph which connects all vertices 302 of V in G with $|V|-1$ edges such that each vertex 302, except the root, has one and only one incoming edge, in other words, without any cycle. For the minimal execution ordering, $O_{low}(H)$, every vertex 302 (except the virtual ground) has one and only one computation source modeled by an incoming edge in the MST. No computation circles exist in $O_{low}(H)$. For each of the $|V|-1$ vertices 302 (except the virtual ground), one computation source (incoming edge) is selected. $|V|-1$ edges are selected such that the sum of computation costs is the minimum among all possible execution ordering $O_i(H)$. Finding an execution ordering with lowest cost for H is equivalent to finding an MST in G.

There are many possible solutions for the MST graph problem. Any of these solutions that works on cyclic directed graphs could be applied. In one embodiment, the Gabow algorithm may be used to find the MST over directed graph, G. Using the Gabow algorithm, edges are found which have the minimum cost to eliminate cycles, if any. The Gabow algorithm may include two phases. The first phase uses a depth-first strategy to choose roots for growth steps. The second phase consists of expanding the cycles formed during the first phase, if any, in reverse order of their contraction. One edge is discarded from each cycle to form a spanning tree in the original graph. The Gabow algorithm recursively finds the tree in the new graph until no cycles exist. By breaking the cycle into a tree, an MST is eventually identified.

FIGS. 3A and 3B are used herein to illustrate a use of the Gabow algorithm. A tree cannot contain cycles. In Gabow's algorithm, an initial solution is created which might contain cyles, so the initial solution might not be a tree. Therefore, all the cycles are eliminated to obtain the tree. The Gabow algorithm finds the edges 304 that have the minimum cost to eliminate cycles, if any. For each vertex 302, the incoming edge 304 with the minimum cost is selected. Applying the Gabow algorithm to the exemplary directed graph, G, shown in FIG. 3A yields the set of edges {(1, 2), (2, 5), (4, 3), (3, 6), (3, 7), (7, 4)}. The vertices 302 representing queries q3, q4 and q7 form a cycle 306, as shown in FIG. 3B. Further, the edge 304 from vertex for q1 to the cycle 306 has the minimum cost among all the ingoing edges 304 to the cycle 306. The vertex 302 for query q1 points to the vertex 302 for query q3 in the cycle 306. Thus, the Gabow algorithm technique finds the minimum cost by replacing edge e(4, 3) with edge e(1, 3), giving a new set {(1, 2), (2, 5), (1, 3), (3, 6), (3, 7), (7, 4)}. Hence the cycle 306 is eliminated.

Referring back to FIG. 2, at block 208, a query execution ordering may be determined based on a minimum spanning tree of the directed graph 300. An execution ordering of a query workload expressed in the hierarchy 100 may be represented as, $O_i(H)$. The execution ordering $O_i(H)$ for queries in the hierarchy 100, H, represents a partial order of n computation strategies for the n queries in H. The execution ordering, $O_i(H)$, may be a set that includes orderings, $<O_i(1), \ldots, O_i(j), \ldots, O_i(n)>$ such that for $1 \leq j \leq n$, $O_i(j)$ selects one of the three computation strategies for a query $q_j \in H$. As stated previously the computation strategies for computing the queries may include computing a query independently, conditionally computing a query from an ancestor, and conditionally computing a query from a descendant. If the computation method applied to $q_j$ is a conditional computation, $C_{compute(qj/qi)}$, then $q_i$ precedes $q_j$ in $O_i(j)$. Each query $q_j$ is computed once. Each execution ordering $O_i(H)$ has an associated computation cost, denoted by Cost($O_i(H)$) as shown in Equation 1.

$$\text{Cost}(O_i(H)) = \Sigma_{j=1}^{n, qj \in H} C_{qj} \qquad (1)$$

In equation (1), $C_{qj}$ is equal to the cost to compute $q_j$ as selected by $O_i(j)$. The execution ordering with the lowest computational cost, denoted by $O_{low}(H)$, is the execution ordering such that for all i, $Cost(O_{low}(H)) \leq Cost(O_i(H))$.

For an execution ordering $O_i(H)$, each query $q_j$ in H is either computed independently or conditionally from another query, $q_i$, in H. In other words, each query, $q_j$, has one and only one computation source. Thus, no computation circles exist in an $O_i(H)$ ordering.

The method 200 efficiently determines a minimal execution ordering for a set of queries 102 in the hierarchy 100. Further, this method scales for larger numbers of queries 102 than shown in the hierarchy 100.

Figure 4:
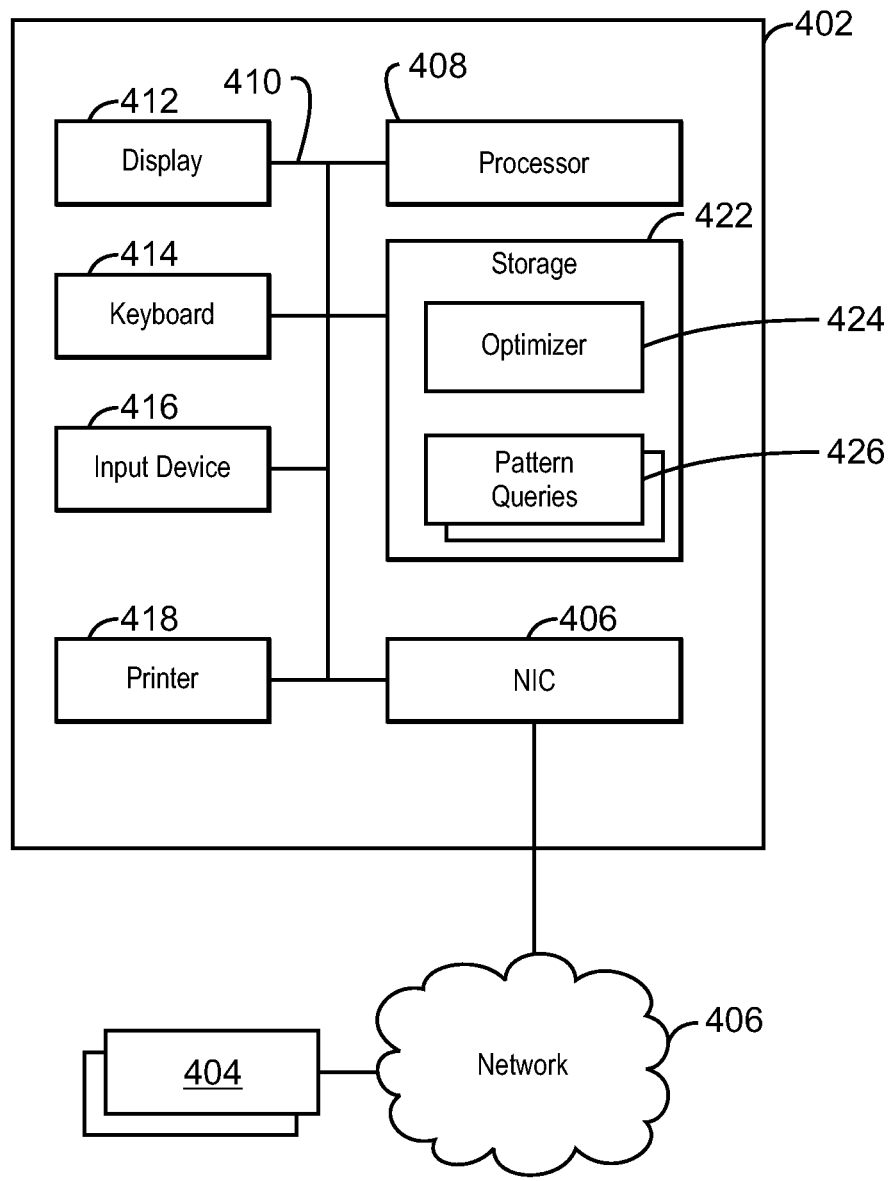
FIG. 4 is a block diagram of a system for determining an execution ordering, in accordance with embodiments.

FIG. 4 is a block diagram of a system 400 for determining an execution ordering, in accordance with embodiments. The functional blocks and devices shown in FIG. 4 may comprise hardware elements, software elements, or some combination of software and hardware. The hardware elements may include circuitry. The software elements may include computer code stored as machine-readable instructions on a non-transitory, computer-readable medium. Additionally, the functional blocks and devices of the system 400 are but one example of functional blocks and devices that may be implemented in an example. Specific functional blocks may be defined based on design considerations for a particular electronic device.

The system 400 may include a server 402, in communication with clients 404, over a network 406. The server 402 may include a processor 408, which may be connected through a bus 410 to a display 412, a keyboard 414, an input device 416, and an output device, such as a printer 418. The input devices 416 may include devices such as a mouse or touch screen. The server 402 may also be connected through the bus 410 to a network interface card 420. The network interface card 420 may connect the server 402 to the network 406. The network 406 may be a local area network, a wide area network, such as the Internet, or another network configuration. The network 406 may include routers, switches, modems, or any other kind of interface device used for interconnection. In one example, the network 406 may be the Internet.

The server 402 may have other units operatively coupled to the processor 412 through the bus 410. These units may include non-transitory, computer-readable storage media, such as storage 422. The storage 422 may include media for the long-term storage of operating software and data, such as hard drives. The storage 422 may also include other types of non-transitory, computer-readable media, such as read-only memory and random access memory. The storage 422 may include the machine readable instructions used in examples of the present techniques. In an example, the storage 422 may include an optimizer 424 and multiple pattern queries 426. The client 404 may submit the pattern queries 426 to the server 402 for execution. The optimizer 424 may generate a unified query plan for the pattern queries 426 according to an execution ordering with a low computational cost.

Figure 5:
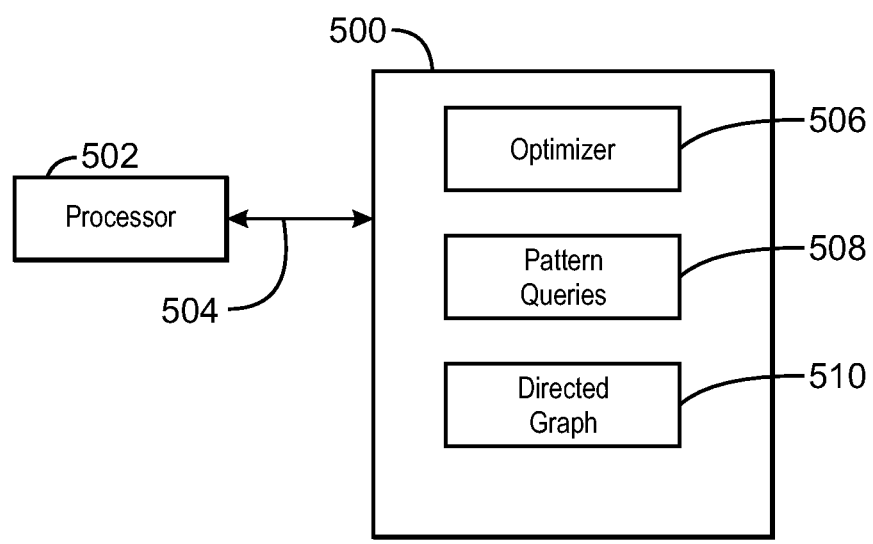
FIG. 5 is a block diagram showing a tangible, machine-readable medium that stores code adapted to determine an execution ordering, in accordance with embodiments.

FIG. 5 is a block diagram showing a tangible, non-transitory, machine-readable medium that stores code adapted to determining an execution ordering, in accordance with embodiments. The machine-readable medium is generally referred to by the reference number 500. The machine-readable medium 500 may correspond to any typical storage device that stores computer-implemented instructions, such as programming code or the like. Moreover, the machine-readable medium 500 may be included in the storage 422 shown in FIG. 4. When read and executed by a processor 502, the instructions stored on the machine-readable medium 500 are adapted to cause the processor 502 to determine an execution ordering of multiple pattern queries 608.

The machine-readable medium 500 stores an optimizer 506 that determines a cost for executing each of the pattern queries 508 independently and conditionally. Further, the optimizer generates a directed graph 510 that includes a vertex for each pattern query 508, and a virtual ground, and an edge between each vertex across refinement relationships. Additionally, the optimizer 506 determines a minimum spanning tree of the directed graph 510, and determines an execution ordering of the pattern queries based on the minimum spanning tree.

What is claimed is:

1. A computer-implemented method of determining an execution ordering, comprising:
   generating a directed graph based on a hierarchy comprising a plurality of pattern queries;
   determining a minimum spanning tree of the directed graph; and
   determining an execution order of the pattern queries based on the minimum spanning tree.

2. The method recited in claim 1, wherein the hierarchy comprises a plurality of parent-child relationships between the plurality of pattern queries, wherein a child pattern query refines data processed by a parent of the child pattern query.

3. The method recited in claim 1, wherein the directed graph comprises:
   a plurality of vertices corresponding to the plurality of pattern queries;
   a virtual ground vertex comprising a root of the directed graph;
   a plurality of first edges corresponding to the plurality of parent-child relationships, wherein each of the first edges is associated with a weight corresponding to a cost of processing a first pattern query, at which, the first edge is directed; and
   a plurality of second edges directed from the virtual ground vertex to the plurality of vertices, wherein each of the second edges is associated with a weight corresponding to a cost of processing the first pattern query, at which the second edge is directed.

4. The method recited in claim 3, wherein the cost comprises a cost of processing the first pattern query independently if the associated edge is directed from the virtual ground vertex.

5. The method recited in claim 4, wherein the first pattern query is processed using a stack-based join.

6. The method recited in claim 3, wherein the cost comprises a cost of processing the first pattern query after processing a previously executed pattern query from which the associated edge is directed.

7. The method recited in claim 6, wherein the first pattern query is a child of the previously executed pattern query, and the first pattern query is conditionally computed using a general to specific evaluation.

8. The method recited in claim 6, wherein the first pattern query is a parent of the previously executed pattern query, and the first pattern query is conditionally computed using a specific to general evaluation.

9. A computer system for determining an execution ordering, the computer system comprising:
   a processor that is adapted to execute stored instructions; and
   a memory device that stores instructions, the memory device comprising:
   computer-implemented code adapted to generate a directed graph based on a hierarchy comprising a plurality of pattern queries, wherein the hierarchy comprises a plurality of parent-child relationships between the plurality of pattern queries, wherein a child pattern query refines data processed by a parent of the child pattern query;

computer-implemented code adapted to determine a minimum spanning tree of the directed graph; and computer-implemented code adapted to determine an execution order of the pattern queries based on the minimum spanning tree.

10. The computer system recited in claim 9, wherein the directed graph comprises:

a plurality of vertices corresponding to the plurality of pattern queries;

a virtual ground vertex comprising a root of the directed graph;

a plurality of first edges corresponding to the plurality of parent-child relationships, wherein each of the first edges is associated with a weight corresponding to a cost of processing a first pattern query, at which, the first edge is directed; and a plurality of second edges directed from the virtual ground vertex to the plurality of vertices, wherein each of the second edges is associated with a weight corresponding to a cost of processing the first pattern query, at which the second edge is directed.

11. The computer system recited in claim 10, wherein the cost comprises a cost of processing the first pattern query independently if the associated edge is directed from the virtual ground vertex.

12. The computer system recited in claim 11, wherein the first pattern query is processed using a stack-based join.

13. The computer system recited in claim 10, wherein the cost comprises a cost of processing the first pattern query after processing a second pattern query from which the associated edge is directed.

14. The computer system recited in claim 13, wherein the first pattern query is a child of the second pattern query, and the first pattern query is conditionally computed using a general to specific evaluation.

15. The computer system recited in claim 13, wherein the first pattern query is a parent of the second pattern query, and the first pattern query is conditionally computed using a specific to general evaluation.

16. A tangible, non-transitory, machine-readable medium that stores machine-readable instructions executable by a processor to determine an execution ordering, the tangible, non-transitory, machine-readable medium comprising:

machine-readable instructions that, when executed by the processor, generate a directed graph based on a hierarchy comprising a plurality of pattern queries, wherein the hierarchy comprises a plurality of parent-child relationships between the plurality of pattern queries, wherein a child refines data processed by a parent of the child pattern query, and wherein the directed graph comprises:

a plurality of vertices corresponding to the plurality of pattern queries;

a virtual ground vertex comprising a root of the directed graph;

a plurality of first edges corresponding to the plurality of parent-child relationships, wherein each of the first edges is associated with a weight corresponding to a cost of processing a first pattern query, at which, the first edge is directed; and a plurality of second edges directed from the virtual ground vertex to the plurality of vertices, wherein each of the second edges is associated with a weight corresponding to a cost of processing the first pattern query, at which the second edge is directed;

machine-readable instructions that, when executed by the processor, determine a minimum spanning tree of the directed graph; and machine-readable instructions that, when executed by the processor, determine an execution order of the pattern queries based on the minimum spanning tree.

17. The tangible, machine-readable medium recited in claim 16, wherein the cost comprises a cost of processing the first pattern query independently if the associated edge is directed from the virtual ground vertex.

18. The tangible, machine-readable medium recited in claim 17, wherein the first pattern query is processed using a stack-based join.

19. The tangible, machine-readable medium recited in claim 16, wherein the cost comprises a cost of processing the first pattern query after processing a second pattern query from which the associated edge is directed.

20. The tangible, machine-readable medium recited in claim 19, wherein, if the first pattern query is a child of the second pattern query, the first pattern query is conditionally computed using a general to specific evaluation, and wherein, if the first pattern query is a parent of the second pattern query, the first pattern query is conditionally computed using a specific to general evaluation.

* * * * *